United States Patent
Campbell

(12) 
(10) Patent No.: US 12,078,083 B2
(45) Date of Patent: Sep. 3, 2024

(54) CONTOUR WEAVES FOR INTERWOVEN VANES

(71) Applicant: Raytheon Technologies Corporation, Farmington, CT (US)

(72) Inventor: Christian X. Campbell, West Hartford, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 18/084,935

(22) Filed: Dec. 20, 2022

(65) Prior Publication Data

US 2024/0200461 A1 Jun. 20, 2024

(51) Int. Cl.
- *F01D 9/04* (2006.01)
- *B32B 5/02* (2006.01)
- *B32B 5/26* (2006.01)
- *B32B 38/08* (2006.01)

(52) U.S. Cl.
CPC ............. *F01D 9/041* (2013.01); *B32B 5/02* (2013.01); *B32B 5/26* (2013.01); *B32B 38/08* (2013.01); *B32B 2260/021* (2013.01); *B32B 2260/046* (2013.01); *B32B 2262/105* (2013.01); *B32B 2305/076* (2013.01); *B32B 2315/02* (2013.01); *B32B 2603/00* (2013.01); *F05D 2220/32* (2013.01); *F05D 2230/23* (2013.01); *F05D 2240/12* (2013.01); *F05D 2300/6033* (2013.01)

(58) Field of Classification Search
CPC .. F01D 9/041; B32B 5/02; B32B 5/26; B32B 38/08; B32B 2260/021; B32B 2260/046; B32B 2262/105; B32B 2305/076; B32B 2315/02; B32B 2603/00; F05D 2220/32; F05D 2230/23; F05D 2240/12; F05D 2300/6033

USPC ..................... 156/293, 305, 306.6
See application file for complete search history.

(56) References Cited

U.S. PATENT DOCUMENTS

| | | | | |
|---|---|---|---|---|
| 4,594,761 A | * | 6/1986 | Murphy | .............. F01D 5/282 29/418 |
| 9,011,085 B2 | * | 4/2015 | Suciu | .............. F01D 9/041 29/889.22 |
| 9,103,214 B2 | * | 8/2015 | McCaffrey | .............. F01D 9/041 |
| 9,151,166 B2 | | 10/2015 | Uskert | |
| 9,752,445 B2 | * | 9/2017 | Watanabe | .............. F01D 5/282 |
| 10,006,301 B2 | * | 6/2018 | Riehl | .............. F01D 5/28 |

(Continued)

FOREIGN PATENT DOCUMENTS

| | | |
|---|---|---|
| JP | 2003148105 A | 5/2003 |
| JP | 3978766 B2 | 7/2007 |

OTHER PUBLICATIONS

Extended European Search Report for EP Application No. 23218784.9, dated Apr. 8, 2024, 9 pages.

*Primary Examiner* — Brian Christopher Delrue
(74) *Attorney, Agent, or Firm* — Kinney & Lange, P.A.

(57) ABSTRACT

A method of forming a ceramic matrix composite (CMC) vane comprises drawing a continuous fiber sheet over at least one contoured surface to form a single-folded sheet. The single-folded sheet comprises an airfoil portion, a first platform at a first end of the airfoil portion, and an integral transition region between the airfoil portion and the first platform. The method further comprises mounting the airfoil portion on a mandrel, attaching a second platform to a second, opposing end of the airfoil portion to form a vane preform, and densifying the vane preform.

13 Claims, 8 Drawing Sheets

(56) References Cited

U.S. PATENT DOCUMENTS

| | | | |
|---|---|---|---|
| 10,815,801 B2 | 10/2020 | Watanabe | |
| 11,549,380 B2* | 1/2023 | Farrar | B29C 70/32 |
| 2004/0120811 A1* | 6/2004 | Darkins, Jr. | F01D 9/042 |
| | | | 415/191 |
| 2007/0096371 A1* | 5/2007 | McGuigan | C04B 35/80 |
| | | | 264/650 |
| 2014/0010662 A1* | 1/2014 | Duelm | F01D 5/282 |
| | | | 29/889.6 |
| 2016/0177743 A1* | 6/2016 | Thomas | F01D 5/284 |
| | | | 29/889.71 |
| 2016/0348518 A1 | 12/2016 | Podgorski et al. | |
| 2017/0266893 A1* | 9/2017 | Marin | B29C 70/68 |
| 2019/0323371 A1* | 10/2019 | Harris | F01D 11/008 |
| 2021/0140319 A1* | 5/2021 | Mardjono | B29C 70/70 |
| 2021/0156266 A1* | 5/2021 | Farrar | F01D 5/282 |
| 2022/0316353 A1* | 10/2022 | Quach | F01D 5/147 |
| 2023/0243037 A1* | 8/2023 | Smith | C04B 41/009 |
| | | | 428/141 |
| 2023/0366318 A1* | 11/2023 | White, III | F01D 9/041 |
| 2023/0392508 A1* | 12/2023 | Campbell | F01D 25/246 |

\* cited by examiner

CONTOUR WEAVES FOR INTERWOVEN VANES

BACKGROUND

The present disclosure relates generally to ceramic matrix composite (CMC) structures in gas turbine engines and more particularly to CMC vanes.

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. CMC materials are also being considered for airfoils. Among other attractive properties, CMCs have high temperature resistance. Despite this attribute, however, there are unique challenges to implementing CMCs in airfoils.

SUMMARY

A method of forming a ceramic matrix composite (CMC) vane comprises drawing a continuous fiber sheet over at least one contoured surface to form a single-folded sheet. The single-folded sheet comprises an airfoil portion, a first platform at a first end of the airfoil portion, and an integral transition region between the airfoil portion and the first platform. The method further comprises mounting the airfoil portion on a mandrel, attaching a second platform to a second, opposing end of the airfoil portion to form a vane preform, and densifying the vane preform.

A method of forming a ceramic matrix composite (CMC) vane comprises drawing a first continuous fiber sheet over at least one contoured surface to form a first single-folded sheet. The first single-folded sheet comprises a first airfoil portion, a first platform at a first end of the first airfoil portion, and a first integral transition region between the first airfoil portion and the first platform. The method further comprises mounting the first airfoil portion on a mandrel, attaching a second platform to a second, opposing end of the first airfoil portion to form a vane preform, and densifying the vane preform.

A ceramic matrix composite (CMC) vane comprises a first platform, a second platform, at least one airfoil extending between and connected to each of the first platform and the second platform, and at least one integral transition region between the at least one airfoil and the first platform. A continuous single-folded fiber sheet forms the first platform, the at least one airfoil, and the at least one integral transition region.

Figure 1:
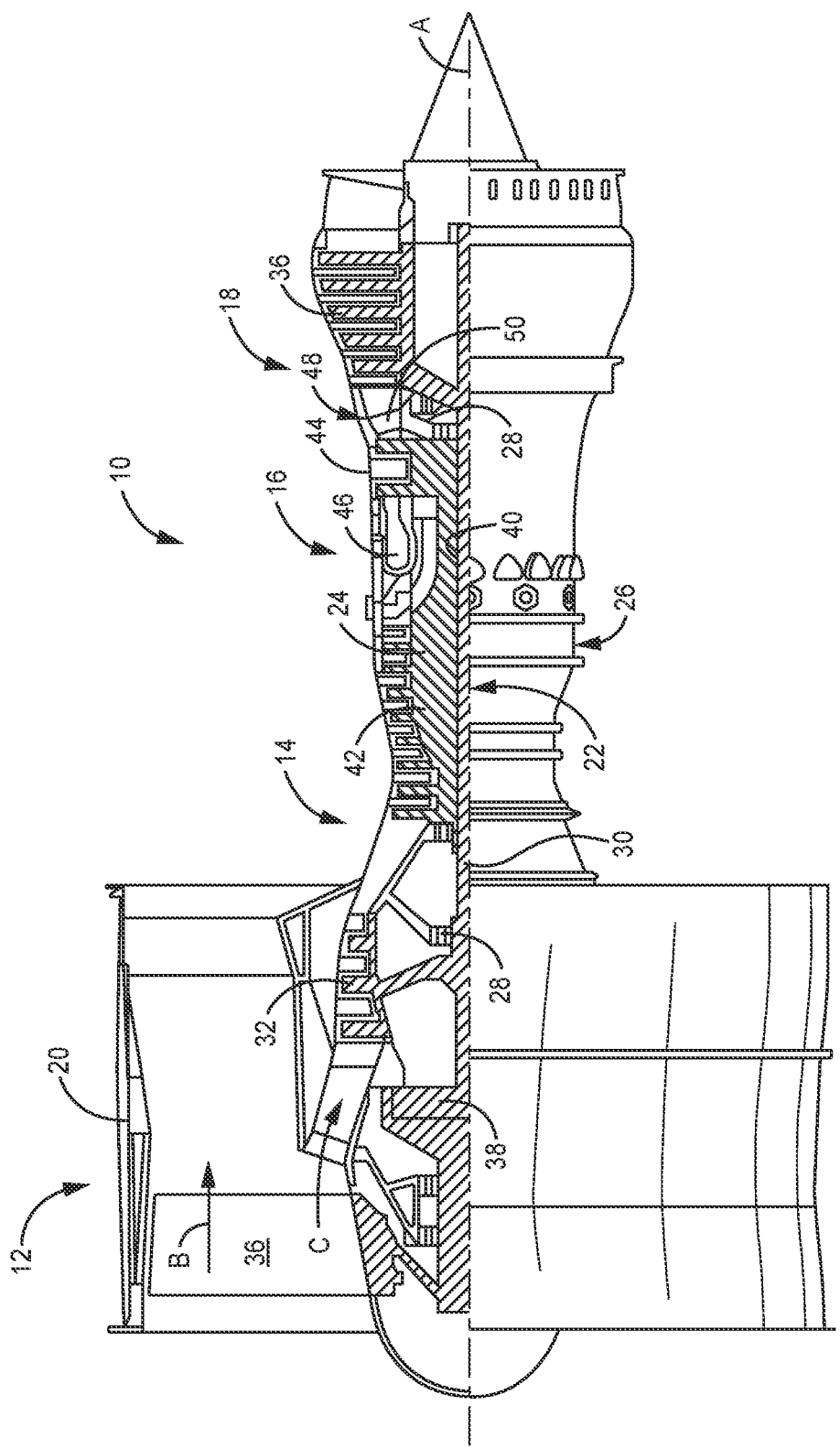
FIG. 1 a simplified cross-sectional view of an exemplary gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 is a simplified cross-sectional view of gas turbine engine 10. Gas turbine engine 10 is disclosed herein as a two-spool turbofan that generally incorporates fan section 12, a compressor section 24, combustor section 66, and turbine section 18. Fan section 12 drives air along bypass flow path B in a bypass duct defined within housing 20, such as a fan case or nacelle, and also drives air along core flow path C for compression and communication into combustor section 16 then expansion through turbine section 18. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 10 generally includes low speed spool 22 and high speed spool 24 mounted for rotation about an engine central longitudinal axis A relative to engine static structure 26 via several bearing systems 28. It should be understood that various bearing systems 28 at various locations may alternatively or additionally be provided, and the location of bearing systems 28 may be varied as appropriate to the application.

Low speed spool 22 generally includes inner shaft 30 that interconnects, a first (or low) pressure compressor 32 and a first (or low) pressure turbine 34. Inner shaft 30 is connected to fan 36 through a speed change mechanism, which in exemplary gas turbine engine 10 is illustrated as geared architecture (i.e., fan drive gear system) 38 to drive fan 36 at a lower speed than low speed spool 22. High speed spool 24 includes outer shaft 40 that interconnects a second (or high) pressure compressor 42 and a second (or high) pressure turbine 44. Combustor 46 is arranged in the exemplary gas turbine 10 between high pressure compressor 42 and high pressure turbine 44. Mid-turbine frame 48 of engine static structure 26 may be arranged generally between high pressure turbine 44 and low pressure turbine 34. Mid-turbine frame 48 further supports bearing systems 28 in the turbine section 18. Inner shaft 30 and outer shaft 40 are concentric and rotate via bearing systems 28 about the engine central longitudinal axis A which is collinear with their longitudinal axes.

The core airflow is compressed by low pressure compressor 32 then high pressure compressor 42, mixed and burned with fuel in the combustor 46, then expanded through high pressure turbine 44 and low pressure turbine 34. Mid-turbine frame 48 includes airfoils 50 which are in core airflow path C. Turbines 34, 44 rotationally drive the respective low speed spool 22 and high speed spool 24 in response to the expansion. It will be appreciated that each of the positions of the fan section 12, compressor section 14, combustor section 16, turbine section 18, and fan drive gear system 38 may be varied. For example, fan drive gear system 38 may be located aft of low pressure compressor 44, aft of combustor section 16, or even aft of turbine section 18, and fan 36 may be positioned forward or aft of the location of fan drive gear system 38.

Engine 10 in one example is a high bypass geared aircraft engine. In a further example, the engine bypass ration is greater than about six (6), with an example embodiment being greater than about ten (10), and can be less than or equal to about 18.0, or more narrowly can be less than or equal to 16.0. The geared architecture 38 is an epicyclic gear train, such as a planetary gear system or other gear system, with a gear reduction ratio of greater than about 2.3. The gear reduction ratio may be less than or equal to 4.0. Low pressure turbine 34 has a pressure ratio that is greater than about five. The low pressure turbine pressure ratio can be less than or equal to 13.0, or more narrowly less than or equal to 12.0. In one disclosed embodiment, engine bypass ratio is greater than about ten (10:1), the diameter of fan 36 is significantly larger than that of low pressure compressor 32, and low pressure turbine 34 has a pressure ratio that is greater than about five 5:1. The low pressure turbine pressure ratio is pressure measured prior to an inlet of low pressure turbine 34 as related to the pressure at the outlet of low pressure turbine 34 prior to an exhaust nozzle. Geared architecture 38 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by bypass flow B due to the high bypass ratio. Fan section 12 of engine 10 is designed for a particular flight condition, typically cruise at about 0.8 Mach and about 35,000 feet (10,668 meters). The flight condition of 0.8 Mach and 35,000 ft (10,668 meters), with engine 10 at its best fuel consumption—also known as "bucket cruise Thrust Specific Fuel Consumption ('TSFC')"—is the industry standard parameter of lbm of fuel being burned divided by lbf of thrust engine 10 produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2A:
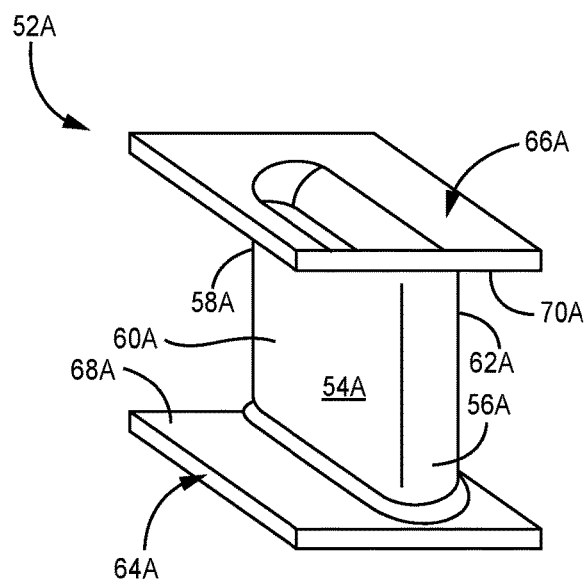
FIGS. 2A and 2B are perspective views of a vane singlet and vane doublet, respectively.
Figure 2B:
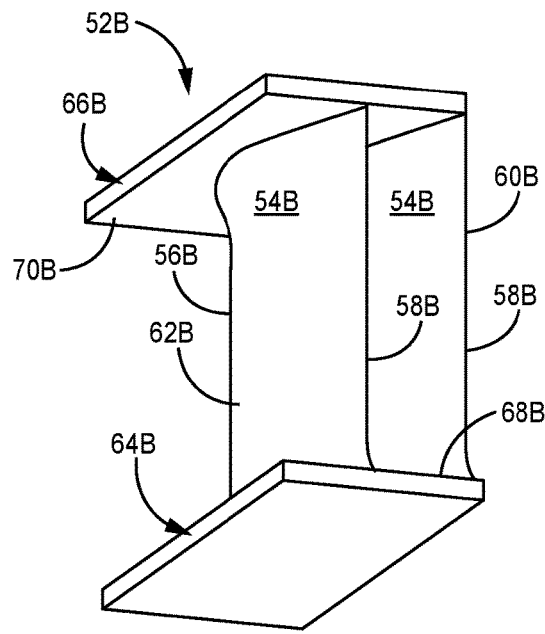

Airfoil vanes in a turbine section of a gas turbine engine (e.g., engine 10) can be provided as vane multiplets (e.g., doublets, triplets, etc.) or vane singlets. Vane multiplets have two or more airfoils affixed with a single common outer wall and a single common inner wall. An airfoil singlet has one airfoil adjoined with a single inner wall and a single outer wall. FIG. 2A is a perspective view of vane singlet 52A, and FIG. 2B is a perspective view of vane doublet 52B. FIGS. 2A and 2B are discussed together.

Vane singlet 52A includes airfoil 54A having leading edge 56A, trailing edge 58A, pressure side 60A, and suction side 62A. Trailing edge 58A is oppositely disposed from leading edge 56A, and suction side 62A is oppositely disposed from pressure side 60A. Vane singlet 52A further includes inner diameter (ID) platform 64A and oppositely disposed outer diameter (OD) platform 66A. With respect to engine 10, the relative terms "inner diameter" and "outer diameter" refer to the proximity to longitudinal axis A of engine 10, with the outer diameter being radially further from axis A than the inner diameter. Airfoil 54A is connected to and extends between ID platform 64A and OD platform 66A. ID platform 64A and OD platform 66A each include respective gas path surfaces 68A, 70A. In an alternative embodiment, airfoil 54A can alternatively be part of a rotor blade, and in such an embodiment, would include only ID platform 64A.

Vane doublet 52B similarly includes two airfoils 54B, each having leading edge 56B, trailing edge 58B, pressure side 60B, and suction side 62B. Each trailing edge 58B is oppositely disposed from a respective leading edge 56B, and each suction side 62B is oppositely disposed from a respective pressure side 60B. Vane doublet 52B further includes ID platform 64B with gas path surface 68B, and oppositely disposed OD platform 66B with gas path surface 70B.

Vane singlet 52A and vane doublet 52B can be formed from sheets/plies of ceramic fibers arranged in one of various two or three-dimensional woven architectures such as plain, harness (e.g., 3, 5, 8, etc.), twill, braid, or non-symmetric, or from non-woven (e.g., chopped, felted, etc.) fibers. The fibers can be reinforced with a ceramic matrix. The fibers and/or matrix can be formed from silicon carbide (SiC) or silicon nitride ($Si_3N_4$).

In general, airfoils have relatively complex three-dimensional shapes and contours on the airfoil section and the platform(s). These shapes and contours include radii of curvature at the filet/transition between the airfoil section and the platform, surface contours, curvature at the leading end, and contours at the trailing end. Together, these types of shapes and contours challenge the process of forming woven fabric plies into the desired shape of the airfoil during layup. A contour weaving technique can simplify the complexity of the layup. More specifically, single-folded contour weaving can produce a continuous fabric forming the structure of the airfoil with one of the platforms (i.e., ID or OD). A second technique can be used to join the other platform to the airfoil, as is discussed in greater detail below. The use of a continuous fabric results in greater structural integrity, specifically with respect to high-stress regions, such as transition regions. Single-folded contour fabrics can be more versatile than double-folded contour fabrics because they are less limiting and can be used to form more shapes/structures than double-folded contour fabrics. For example, single-folded contour fabrics can be used to form blades, vane singlets, and vane doublets. Additionally, single-folded contour fabrics can also be easier to manufacture and handle than double-folded contour fabrics.

Figure 3:
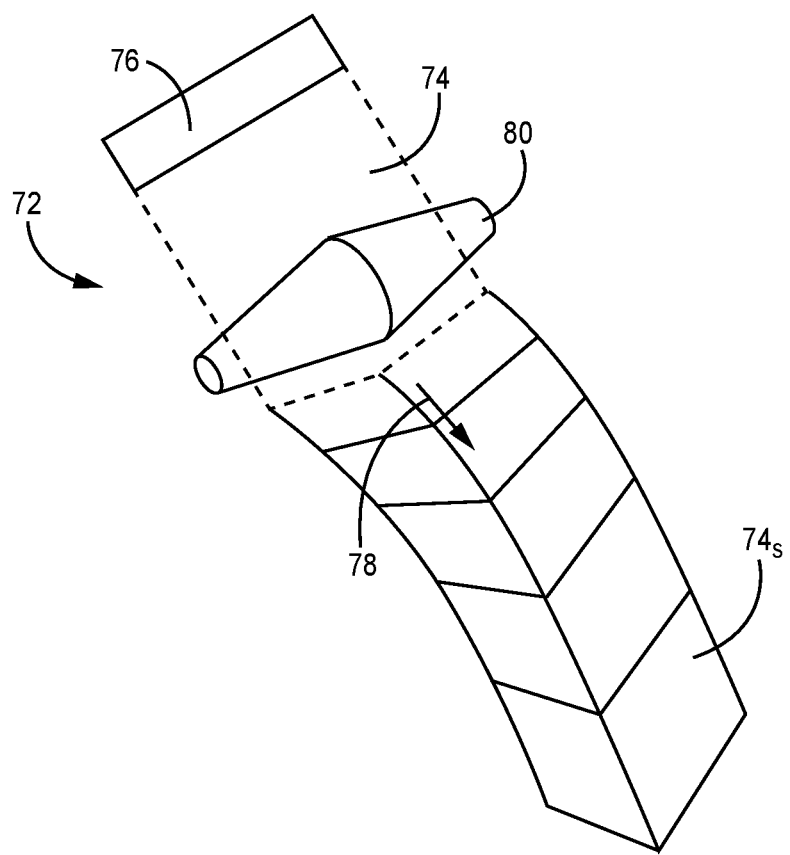
FIG. 3 is a simplified illustration of a weaving apparatus for producing a single-folded contoured fabric.

FIG. 3 is a simplified illustration of weaving apparatus 72 for producing single-folded sheet $74_S$. An un-contoured sheet 74 (represented by dashed lines) is taken from loom 76 in the direction of arrow 78, and drawn over one or more contoured rollers 80, although only one is depicted in FIG. 3. Rollers 80 form/shape single-folded sheet $74_S$. Other types of contoured surfaces are contemplated herein. A spool (not shown) can be used to apply tension to sheet 74 as it is drawn over rollers 80, and to take up/collect sheet 74 (as single-folded sheet $74_S$). Various guide bars (not shown) can be used to keep sheet 74 in position over rollers 80.

Figure 4A:
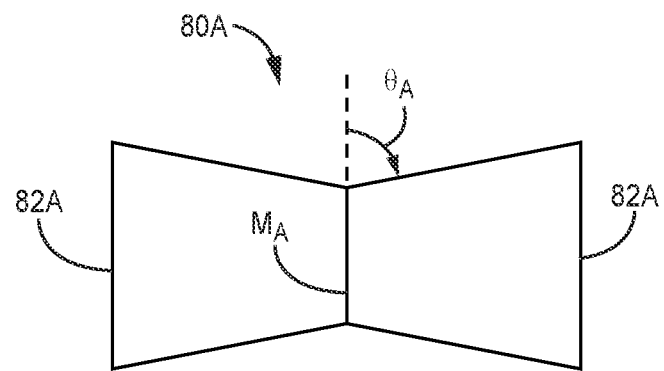
FIGS. 4A and 4B are simplified illustrations of respective alternative rollers of the apparatus of FIG. 3.
Figure 4B:
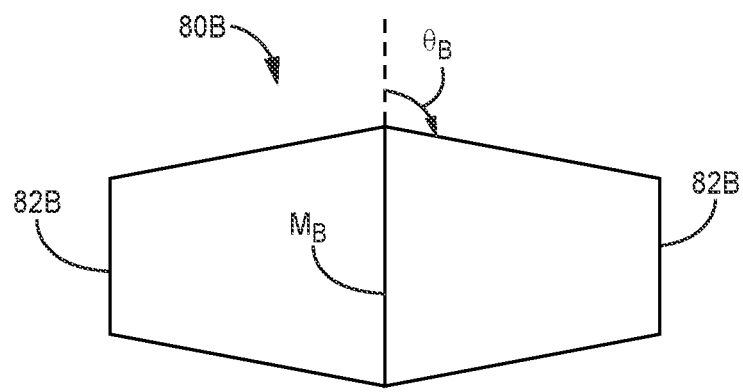

FIGS. 4A and 4B are simplified illustrations of alternative rollers 80A and 80B, respectively. Roller 80A is a concave roller with its outer surface tapering inward from each opposing end 82A toward midline $M_A$. Angle $\theta_A$, measured from a dashed line representing a continuation of midline $M_A$ to the outer surface of roller 80A is less than 90°. Roller 80B conversely is a convex roller with its outer surface tapering outward from midline $M_B$ toward each opposing end 82B. Angle $\theta_B$, measured from a dashed line representing a continuation of midline $M_B$ to the outer surface of roller 80B is greater than 90°. Depending on the embodiment, weaving apparatus 72 can include a single type of roller 80 (i.e., 80A or 80B), or one or more of each type of roller 80, for example, in an alternating manner. For multiple rollers 80A, angle $\theta_A$ can gradually decrease, and for multiple roller 80B, angle $\theta_B$ can gradually increase to create single-folded sheet $74_S$ with a platform portion transitioning to an airfoil portion, with midlines $M_A$ and/or $M_B$ generally forming the transition (i.e., the fold) between the two portions. Rollers 80A and 80B can be arranged in corresponding pairs (i.e., one roller 80A mated with one roller 80B) within weaving apparatus 72.

Figure 5:
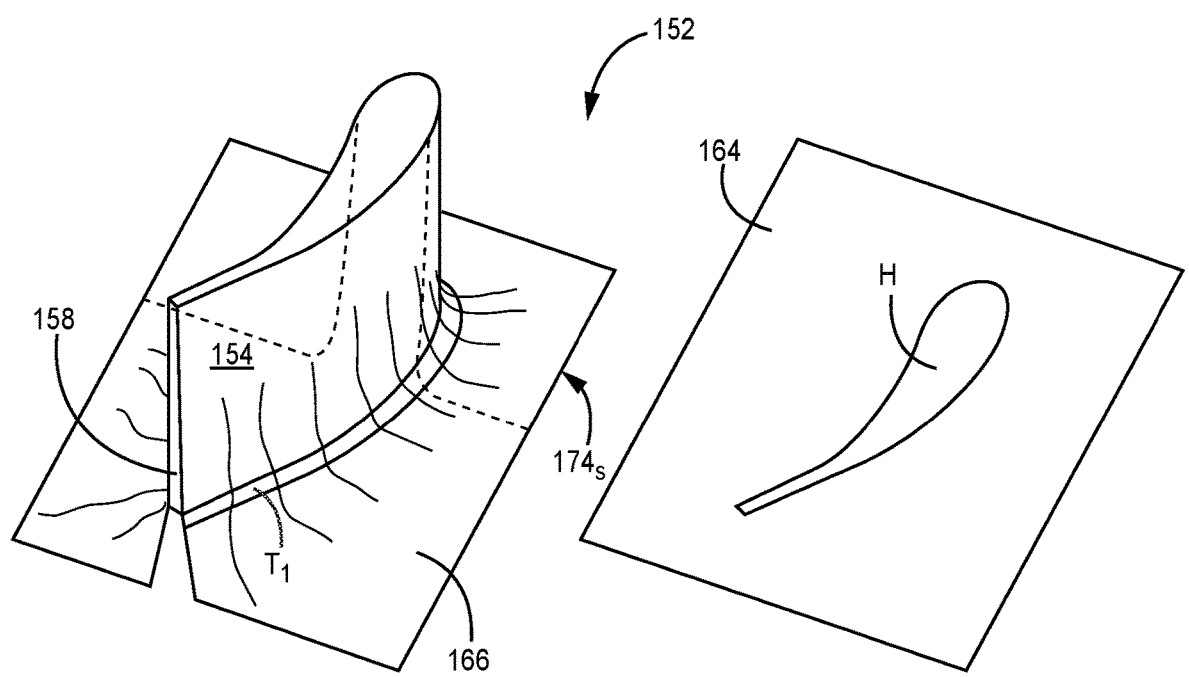
FIG. 5 is a simplified perspective view of two portions of vane singlet preform.

FIG. 5 is a simplified perspective view of two portions of vane singlet preform 152. To the left of FIG. 5 are OD platform 166 and airfoil 154, formed from single-folded sheet $174_S$. Airfoil 154 includes trailing edge 158. To the right is separately formed ID platform 164, which can be joined to airfoil 154 using other means. In an alternative embodiment, sheet $174_S$ can be used to form airfoil 154 and ID platform 164, and OD platform 166 can be separately formed and attached. Airfoil 154 can be mounted on an airfoil shaped mandrel (not shown) for shaping and support during layup. Transition region $T_1$, connecting airfoil 154 to OD platform 166 is an integral feature of vane singlet preform 152, because of the continuous construction of sheet $174_S$. Transition region $T_1$ can be formed into sheet $174_S$ during the weaving process by midpoints M of the various rollers 80. ID platform 164 can be constructed with an airfoil-shaped hole H to facilitate its joining to the remaining preform structure.

Figure 6:
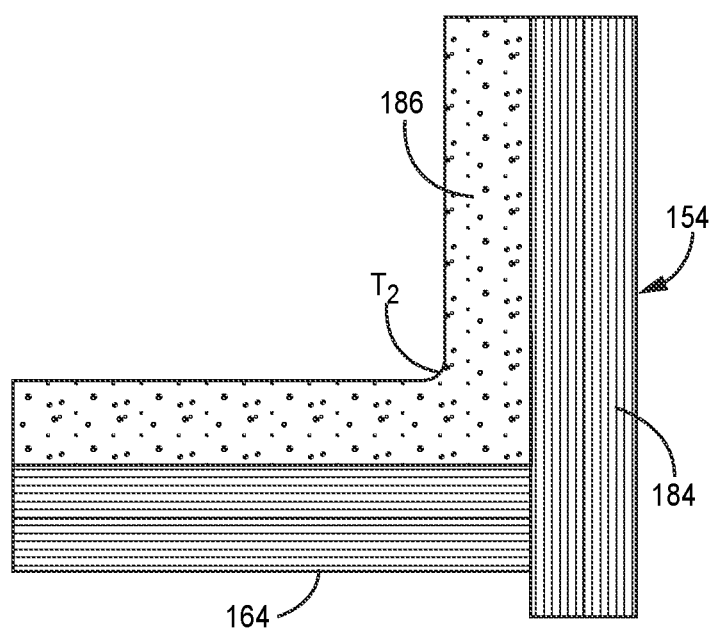
FIG. 6 is a simplified cross-sectional view of a portion of the airfoil and inner diameter platform of the vane singlet preform of FIG. 5.

By way of a first example, ID platform 164 can be joined to airfoil 154 by shear tube connection. FIG. 6 schematically illustrates a portion of airfoil 154 and ID platform 164. Airfoil 154 can be formed from one or more shear tube layers 184 comprising fibrous ceramic fabric. ID platform 164 can be positioned to abut an outermost shear tube layer 184. One or more overwrap layers/sheets 186 can then be placed over shear tube layers 184 and ID platform 164 forming shear tube transition region $T_2$ between airfoil 154 and ID platform 164.

Figure 7:
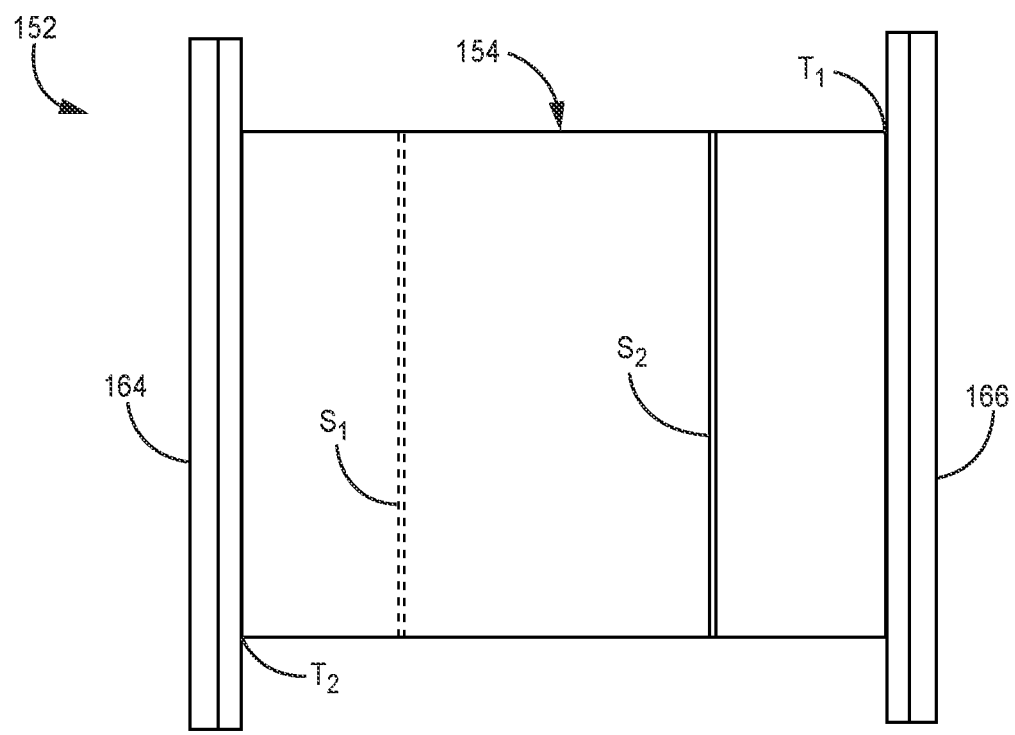
FIG. 7 is a simplified cross-sectional view of the vane singlet preform formed by splicing.

By way of a second example, multiple individual sheets $174_S$ can be formed into ID platform 164 with a portion of airfoil 154 and OD platform 166 with another portion of airfoil 154. The sheets $174_S$ can be joined/spliced together to form a vane singlet preform. FIG. 7 schematically illustrates such a vane singlet preform 152 formed by splicing sheets $174_S$ at first splice $S_1$ (represented by dashed lines as being underneath the subsequent layer) to form a first contoured fabric layer, and splicing additional sheets $174_S$ at second splice $S_2$ to form a second contoured fabric layer. Additional layers are contemplated herein. As is shown in FIG. 7, splices $S_1$ and $S_2$ can be offset from one another at various radial locations along airfoil 154, preferably, at low-stress locations. The staggering of splices further prevents any one region from being overly vulnerable to mechanical and/or thermal stresses. Additionally, transition regions $T_1$ and $T_2$ are both integral features belonging to a respective sheet $174_S$.

Alternatively, ID platform 164 can be joined to airfoil 154 using a cutting and darting technique. In such technique, a collar or tube structure is inserted into airfoil 154 and cut into strips which are easier to fold down over ID platform 164. Additional plies can be added to reinforce the union of ID platform 164 and the strips.

Referring back to FIG. 5, trailing edge 158 formed by sheet $174_S$ can, in one example, be externally wrapped around an internal preform structure (e.g., a y-weave) that extends past trailing edge 158. The excess material can then be machined to a final length. Stuffer plies may be required to build up the trailing edge thickness. Additionally and/or alternatively, trailing edge 158 formed by sheet $174_S$ and any supplemental internal or external plies can be joined as butt or overlapping splices.

Figure 8:
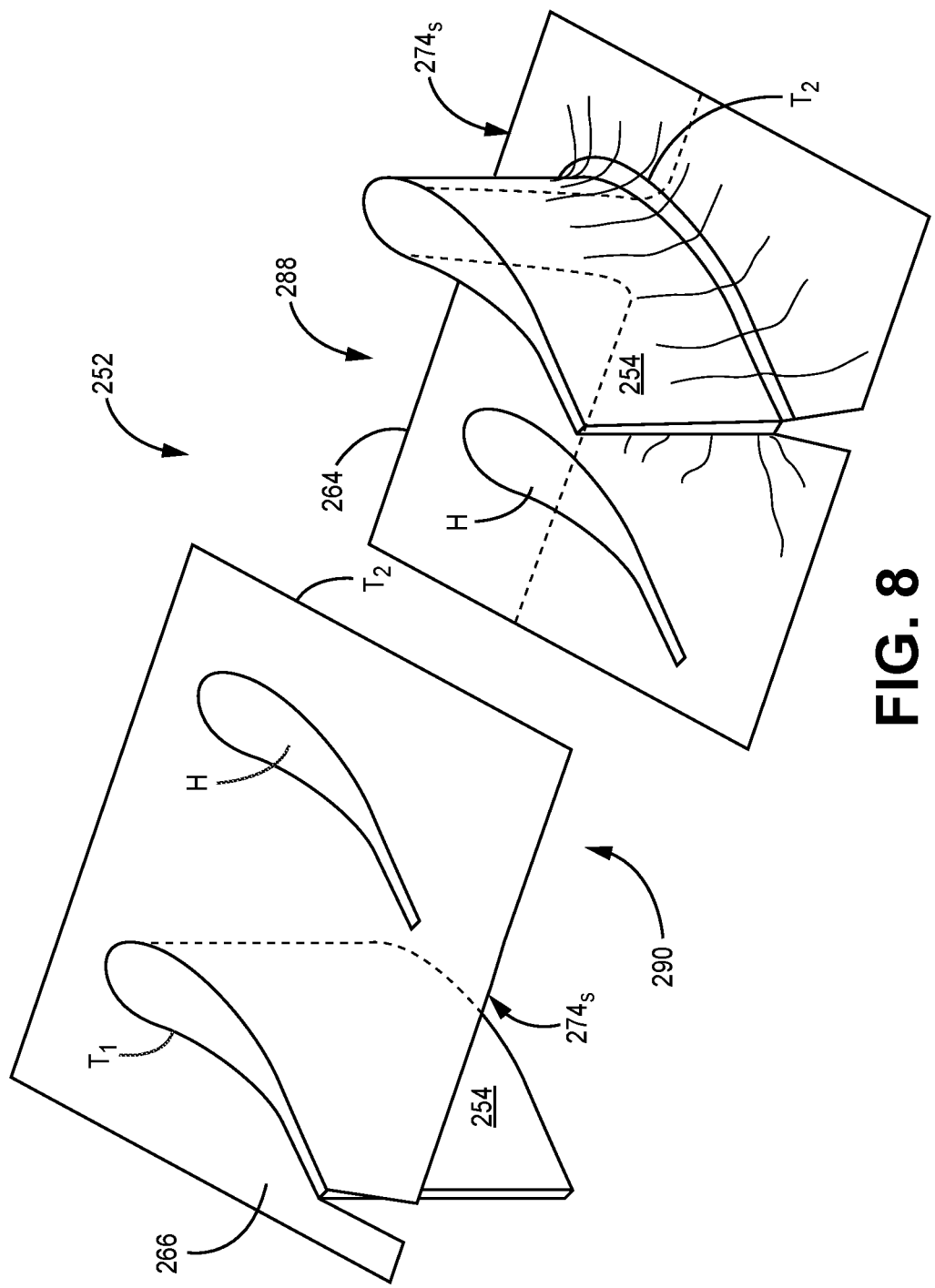
FIG. 8 is a simplified perspective view of two portions of vane doublet preform.

FIG. 8 is a simplified perspective view of two portions of vane doublet preform 252. More specifically, FIG. 8 depicts ID portion 288 formed from a first single-folded sheet $274_S$ and includes first airfoil 254, ID platform 264, and transition region $T_2$ joining the two. FIG. 8 further depicts OD portion 290 formed from a second single-folded sheet $274_S$ and includes second airfoil 254, OD platform 266, and transition region $T_1$ joining the two. ID platform 264 and OD platform 266 each include an airfoil-shaped hole H corresponding to the shape and position of the second and first airfoils, respectively. Each airfoil 254 can be mounted on a mandrel for support and shaping during the layup process. Transition regions $T_1$ and $T_2$ are each integral features of vane doublet preform 252, because of the continuous construction of first and second sheets $274_S$. Each airfoil 254 can be joined to the opposing platform 264 or 266 using a shear tube connection or cutting and darting technique, as are discussed above with respect to vane singlet preform 152. Similarly, the trailing edges can include additional plies, y-weaves, splices, etc.

Preforms 152 and 252 can, after attachment of inner and/or outer diameter platforms 164, 264, 166, 266, be overwrapped with additional plies/sheets of ceramic fabric to create the desired shape and thickness of the final part. Preforms 152 and 252 can then be optionally debulked before densification with the matrix to form the final CMC component. Densification can be carried out using chemical vapor infiltration (CVI). Other densification techniques are contemplated herein, such as one or a combination of slurry infiltration, melt infiltration, and polymer infiltration and pyrolysis. Such techniques can supplement the CVI process. Protective coatings for the CMC component (e.g., thermal barrier coatings, environmental barrier coatings, etc.) can optionally be applied after densification. The resulting CMC component can have a predominantly continuous and relatively smooth surface that is free of discontinuities due to fiber bundle buckles and wrinkles.

Discussion of Possible Embodiments

The following are non-exclusive descriptions of possible embodiments of the present invention.

A method of forming a ceramic matrix composite (CMC) vane comprises drawing a continuous fiber sheet over at least one contoured surface to form a single-folded sheet. The single-folded sheet comprises an airfoil portion, a first platform at a first end of the airfoil portion, and an integral transition region between the airfoil portion and the first platform. The method further comprises mounting the airfoil portion on a mandrel, attaching a second platform to a second, opposing end of the airfoil portion to form a vane preform, and densifying the vane preform.

The method of the preceding paragraph can optionally include, additionally and/or alternatively, any one or more of the following features, configurations and/or additional components:

In the above method, the at least one contoured surface can include at least one of a concave roller and a convex roller.

In any of the above methods, the step of attaching the second platform to the second end of the airfoil portion can include abutting the second platform to a shear tube layer of the airfoil portion, and overwrapping the shear tube layer and the second platform with at least one additional fiber sheet to form a shear tube transition region.

In any of the above methods, densifying the vane preform can include at least one of chemical vapor infiltration, slurry infiltration, melt infiltration, and polymer infiltration and pyrolysis.

In any of the above methods, the single-folded sheet and the second platform can be formed from ceramic fibers.

A method of forming a ceramic matrix composite (CMC) vane comprises drawing a first continuous fiber sheet over at least one contoured surface to form a first single-folded sheet. The first single-folded sheet comprises a first airfoil portion, a first platform at a first end of the first airfoil portion, and a first integral transition region between the airfoil portion and the first platform. The method further comprises mounting the first airfoil portion on a mandrel, attaching a second platform to a second, opposing end of the first airfoil portion to form a vane preform, and densifying the vane preform.

The method of the preceding paragraph can optionally include, additionally and/or alternatively, any one or more of the following features, configurations and/or additional components:

In the above method, the at least one contoured surface can include at least one of a concave roller and a convex roller.

Any of the above methods can further include drawing a second continuous fiber sheet over the at least one contoured surface to form a second single-folded sheet. The single-folded sheet can include a second airfoil portion, the second platform at a first end of the second airfoil portion, and a second integral transition region between the second airfoil portion and the second platform. The method can further include mounting the second airfoil portion on a mandrel, and attaching the first platform to a second, opposing end of the second airfoil portion to form a vane preform.

In any of the above methods, the step of attaching the second platform to the second end of the first airfoil portion can include abutting the second platform to a shear tube layer of the second airfoil portion, and overwrapping the shear tube layer and the second platform with at least one additional fiber sheet to form a shear tube transition region.

In any of the above methods, the vane preform can be a doublet.

Any of the above methods can further include drawing a second continuous fiber sheet over the at least one contoured surface to form a second single-folded sheet. The second single-folded sheet can include a second airfoil portion, the second platform at a first end of the second airfoil portion, and a second integral transition region between the second airfoil portion and the second platform.

Any of the above methods can further include splicing the first single-folded sheet to the second single-folded sheet at a first splice location to form a first layer.

Any of the above methods can further include splicing a third single-folded sheet to a fourth single-folded sheet at a second splice location to form a second layer.

In any of the above methods, the first splice location and the second splice location can be on the airfoil portion.

In any of the above methods, the first splice location and the second splice location can be offset from one another.

A ceramic matrix composite (CMC) vane comprises a first platform, a second platform, at least one airfoil extending between and connected to each of the first platform and the second platform, and at least one integral transition region between the at least one airfoil and the first platform. A continuous single-folded fiber sheet forms the first platform, the at least one airfoil, and the at least one integral transition region.

The CMC vane of the preceding paragraph can optionally include, additionally and/or alternatively, any one or more of the following features, configurations and/or additional components:

In the above CMC vane, the at least one integral transition region can include a first integral transition region and a second integral transition region.

In any of the above CMC vanes, the CMC vane can be a singlet.

In any of the above CMC vanes, the at least one airfoil can include a first airfoil and a second airfoil, and the CMC vane can be a doublet.

A gas turbine engine turbine section can include any of the above CMC vanes.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a ceramic matrix composite (CMC) vane, the method comprising:
   drawing a continuous fiber sheet over at least one contoured surface to form a single-folded sheet, the single-folded sheet comprising:
      an airfoil portion;
      a first platform at a first end of the airfoil portion; and
      an integral transition region between the airfoil portion and the first platform;
   attaching a second platform to a second, opposing end of the airfoil portion to form a vane preform; and
   densifying the vane preform,
   wherein the step of attaching the second platform to the second end of the airfoil portion comprises:
      abutting the second platform to a shear tube layer of the airfoil portion; and overwrapping the shear tube layer and the second platform with at least one additional fiber sheet to form a shear tube transition region.

2. The method of claim 1, wherein the at least one contoured surface comprises at least one of a concave roller and a convex roller.

3. The method of claim 1, wherein densifying the vane preform comprises at least one of chemical vapor infiltration, slurry infiltration, melt infiltration, and polymer infiltration and pyrolysis.

4. The method of claim 1, wherein the single-folded sheet and the second platform are formed from ceramic fibers.

5. A method of forming a ceramic matrix composite (CMC) vane, the method comprising:
   drawing a first continuous fiber sheet over at least one contoured surface to form a first single-folded sheet, the first single-folded sheet comprising:
   a first airfoil portion;
   a first platform at a first end of the first airfoil portion; and
   a first integral transition region between the airfoil portion and the first platform;
   drawing a second continuous fiber sheet over the at least one contoured surface to form a second single-folded sheet, the second single-folded sheet comprising:
   a second airfoil portion;
   a second platform at a first end of the second airfoil portion; and
   a second integral transition region between the second airfoil portion and the second platform;
   attaching the second platform to a second, opposing end of the first airfoil portion;
   attaching the first platform to a second, opposing end of the second airfoil portion to form a vane preform; and
   densifying the vane preform.

6. The method of claim 5, wherein the at least one contoured surface comprises at least one of a concave roller and a convex roller.

7. The method of claim 5, wherein the step of attaching the second platform to the second end of the first airfoil portion comprises:
   abutting the second platform to a shear tube layer of the second airfoil portion; and
   overwrapping the shear tube layer and the second platform with at least one additional fiber sheet to form a shear tube transition region.

8. The method of claim 7, wherein the vane preform is doublet.

9. A method of forming a ceramic matrix composite (CMC) vane, the method comprising:
   drawing a first continuous fiber sheet over at least one contoured surface to form a first single-folded sheet, the first single-folded sheet comprising:
   a first airfoil portion;
   a first platform at a first end of the first airfoil portion; and
   a first integral transition region between the airfoil portion and the first platform;
   attaching a second platform to a second, opposing end of the first airfoil portion to form a vane preform;
   drawing a second continuous fiber sheet over the at least one contoured surface to form a second single-folded sheet, the second single-folded sheet comprising:
   a second airfoil portion;
   the second platform at a first end of the second airfoil portion; and
   a second integral transition region between the second airfoil portion and the second platform; and
   densifying the vane preform.

10. The method of claim 9, and further comprising: splicing the first single-folded sheet to the second single-folded sheet at a first splice location to form a first layer.

11. The method of claim 10 and further comprising: splicing a third single-folded sheet to a fourth single-folded sheet at a second splice location to form a second layer.

12. The method of claim 11, wherein the first splice location and the second splice location are on the airfoil portion.

13. The method of claim 12, wherein the first splice location and the second splice location are offset from one another.

* * * * *